(12) United States Patent
Damman et al.

(10) Patent No.: US 9,969,396 B2
(45) Date of Patent: May 15, 2018

(54) CONTROL STRATEGY FOR UNOCCUPIED AUTONOMOUS VEHICLE

(71) Applicant: GM GLOBAL TECHNOLOGY OPERATIONS LLC, Detroit, MI (US)

(72) Inventors: Scott W. Damman, White Lake, MI (US); Michael E. McGuire, Milford, MI (US); Nicholas D. Theis, St. Johns, MI (US); Nicholas A. Barra, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 41 days.

(21) Appl. No.: 15/267,163

(22) Filed: Sep. 16, 2016

(65) Prior Publication Data

US 2018/0079416 A1    Mar. 22, 2018

(51) Int. Cl.
*B60W 30/18* (2012.01)
*G05D 1/00* (2006.01)
(Continued)

(52) U.S. Cl.
CPC .... *B60W 30/18009* (2013.01); *B60W 10/026* (2013.01); *B60W 10/06* (2013.01); *B60W 10/10* (2013.01); *B60W 10/184* (2013.01); *B60W 10/20* (2013.01); *B60W 10/26* (2013.01); *B60W 10/30* (2013.01); *F16H 61/0213* (2013.01); *G05D 1/0088* (2013.01); *B60W 2710/024* (2013.01); *B60W 2710/244* (2013.01); *B60W 2710/305* (2013.01); *B60W 2720/10* (2013.01); *B60W 2720/106* (2013.01); *F16H 2061/0227* (2013.01)

(58) Field of Classification Search
CPC .......... B60W 30/18009; B60W 10/30; B60W 10/26; B60W 10/026; B60W 10/20; B60W 10/10; B60W 10/184; B60W 2710/024; B60W 2720/10; B60W 2710/305; B60W 2710/244; B60W 2720/106; F16H 61/0213; F16H 2061/0227
See application file for complete search history.

(56) References Cited

U.S. PATENT DOCUMENTS 6,653,747 B1 * 11/2003 Proefke .................. B60R 25/24
                                                      307/10.6
9,663,065 B2 * 5/2017 Hanson .................. B60R 25/20
(Continued)

*Primary Examiner* — David J Hlavka

(57) ABSTRACT

An automotive vehicle includes traction wheels, a powertrain configured to transmit drive power to the traction wheels, a sensor configured to detect a presence of an occupant, an actuator configured to control vehicle steering, acceleration, braking, or shifting, and at least one controller configured to automatically control the actuator based on an automated driving system algorithm. The powertrain is selectively operable in a first mode having a first operating characteristic and a second mode having a second operating characteristic. The controller is further configured to control the powertrain in the first mode in response to the sensor detecting an occupant being present and the actuator being controlled based on the automated driving system algorithm, and in the second mode in response to the sensor detecting no occupant being present and the actuator being controlled based on the automated driving system algorithm.

20 Claims, 3 Drawing Sheets

(51) Int. Cl.
*B60W 10/184* (2012.01)
*B60W 10/10* (2012.01)
*B60W 10/20* (2006.01)
*B60W 10/06* (2006.01)
*B60W 10/02* (2006.01)
*B60W 10/30* (2006.01)
*B60W 10/26* (2006.01)
*F16H 61/02* (2006.01)

(56) References Cited

U.S. PATENT DOCUMENTS

2012/0212353 A1* 8/2012 Fung ................. B60K 28/06
 340/905
2012/0253552 A1* 10/2012 Skelton ............... B60K 28/063
 701/2
2017/0313314 A1* 11/2017 Sen ................. B60W 30/18009

* cited by examiner

CONTROL STRATEGY FOR UNOCCUPIED AUTONOMOUS VEHICLE

TECHNICAL FIELD

The present disclosure relates to vehicles controlled by automated driving systems, particularly those configured to automatically control vehicle steering, acceleration, and braking during a drive cycle without human intervention.

INTRODUCTION

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

An automotive vehicle according to the present disclosure includes traction wheels and a powertrain configured to transmit drive power to the traction wheels. The powertrain is selectively operable in a first mode having a first operating characteristic and a second mode having a second operating characteristic. The vehicle additionally includes an actuator configured to control vehicle steering, acceleration, braking, or shifting. The vehicle also includes a sensor configured to detect a presence of an occupant. The vehicle further includes at least one controller. The controller is configured to automatically control the actuator based on an automated driving system algorithm. The controller is also configured to control the powertrain in the first mode in response to the sensor detecting an occupant being present and the actuator being controlled based on the automated driving system algorithm. The controller is additionally configured to control the powertrain in the second mode in response to the sensor detecting no occupant being present and the actuator being controlled based on the automated driving system algorithm.

According to one embodiment, the first operating characteristic includes a first energy consumption rate and the second operating characteristic includes a second energy consumption rate. The second energy consumption rate is distinct from the first energy consumption rate.

According to one embodiment, the powertrain includes an engine. In such an embodiment, the first mode includes controlling the engine at a first operating point, and the second mode includes controlling the engine at a second operating point. The second operating point is distinct from the first operating point.

According to one embodiment, the powertrain includes a torque converter having a clutch. In such an embodiment, the first mode includes controlling the clutch to a first pressure and the second mode includes controlling the clutch to a second pressure. The second pressure is distinct from the first pressure.

According to one embodiment, the powertrain includes a transmission. In such an embodiment, the first mode includes controlling the transmission according to a first shift schedule and the second mode includes controlling the transmission according to a second shift schedule. The second shift schedule is distinct from the first shift schedule.

According to one embodiment, the vehicle additionally includes an accessory system. In such an embodiment, the controller is additionally configured to, in response to the sensor detecting no occupant being present and the actuator being controlled based on the automated driving system algorithm, reduce a power consumption rate of the accessory system.

According to one embodiment, the at least one controller includes a first microprocessor for controlling the actuator and a second microprocessor for controlling the powertrain.

A method of controlling a vehicle according to the present disclosure includes providing the vehicle with a powertrain configured to provide power to vehicle wheels, and providing the vehicle with at least one actuator configured to control vehicle steering, acceleration braking, or shifting. The method additionally includes providing the vehicle with a controller configured to control the actuator based on an automated driving system algorithm. The method also includes, in response to an occupant being present in the vehicle and the actuator being controlled based on the automated driving system algorithm, automatically controlling the powertrain in a first mode having a first energy consumption rate. The method further includes, in response to no occupant being present in the vehicle and the actuator being controlled based on the automated driving system algorithm, automatically controlling the powertrain in a second mode having a second energy consumption rate. The second energy consumption rate is distinct from the first energy consumption rate.

In one embodiment, the powertrain includes an internal combustion engine operable according to distinct first and second calibrations. In such and embodiment, controlling the powertrain in a first mode includes controlling the internal combustion engine according to the first calibration, and controlling the powertrain in a second mode includes controlling the internal combustion engine according to the second calibration.

In one embodiment, the powertrain includes a torque converter having a clutch. In such an embodiment, controlling the powertrain in a first mode includes controlling the clutch to a first pressure, and controlling the powertrain in a second mode includes controlling the clutch to a second pressure. The second pressure is distinct from the first pressure.

In one embodiment, controlling the powertrain in a second mode includes reducing a maximum allowable acceleration, deceleration, or velocity of the vehicle relative to the first mode.

In one embodiment, the method additionally includes providing the vehicle with an accessory system. In such an embodiment, the method also includes, in response to no occupant being present in the vehicle and the actuator being controlled based on the automated driving system algorithm, automatically reducing a power consumption rate of the accessory system.

In one embodiment, the method additionally includes, in response to a determination that the vehicle is subject to an externally-dictated operating requirement, controlling the powertrain to satisfy the externally-dictated operating requirement independent of occupant presence.

In one embodiment, the controlling the powertrain in a second mode is in further response to a determination that an electric-only operation mode is desired for a subsequent trip. In such an embodiment, controlling the powertrain in a second mode includes controlling the powertrain to increase a high-voltage battery state of charge.

In one embodiment, the controlling the powertrain in a second mode is in further response to a determination that an electric-only operation mode is not desired for a subsequent trip. In such an embodiment, controlling the powertrain in a second mode includes controlling the powertrain to increase energy efficiency.

A system for controlling a vehicle according to the present disclosure includes a first controller and a second controller. The first controller is configured to automatically control at least one actuator of a vehicle steering actuator, an acceleration actuator, a braking actuator, and a shifting actuator based on an automated driving system algorithm. The second controller is configured to selectively control a powertrain of the vehicle in a first mode and in a second mode. The second controller controls the powertrain in the first mode in response to the first controller automatically controlling the actuator based on the automated driving system algorithm and a vehicle occupant being detected. The second controller controls the powertrain in the second mode in response to the first controller automatically controlling the actuator based on the automated driving system algorithm and no vehicle occupant being detected. The first mode has a first operating characteristic and the second mode has a second operating characteristic.

In one embodiment, the first operating characteristic includes a first energy consumption rate and the second operating characteristic includes a second energy consumption rate. The second energy consumption rate is distinct from the first energy consumption rate.

In one embodiment, the second controller is further configured to, in response to a determination that the vehicle is subject to an externally-dictated operating requirement, control the powertrain to satisfy the externally-dictated operating requirement independent of occupant presence.

In one embodiment, the second controller is configured to control the powertrain in the second mode in further response to a determination that an electric-only operation mode is desired for a subsequent trip. In such an embodiment, controlling the powertrain in the second mode includes controlling the powertrain to increase a high-voltage battery state of charge.

In one embodiment, the first controller is associated with a first microprocessor and the second controller is associated with a second microprocessor.

Embodiments according to the present disclosure provide a number of advantages. For example, embodiments according to the present disclosure may improve energy efficiency of autonomous vehicle operation. Embodiments according to the present disclosure may thus be more robust, increasing customer satisfaction.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
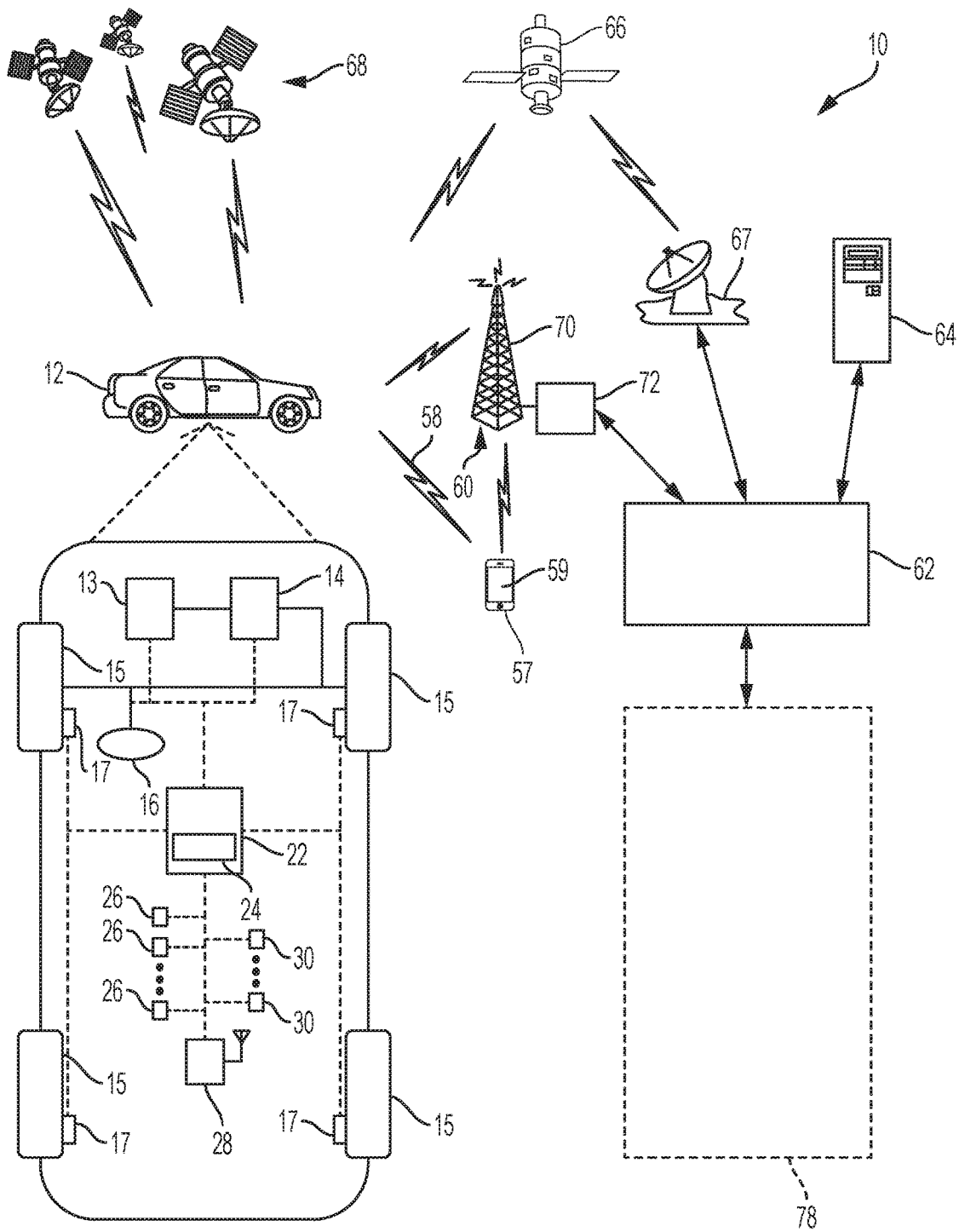
FIG. 1 is a schematic diagram of a communication system including an autonomously controlled vehicle according to an embodiment of the present disclosure.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a networked wireless device, such as a smart phone 57, and a remote access center 78.

The vehicle 12, shown schematically in FIG. 1, includes a propulsion system 13, which may in various embodiments include an internal combustion engine, an electric machine such as a traction motor, and/or a fuel cell propulsion system. Vehicle 12 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, additional or alternate wireless communications standards, such as IEEE 802.11 and cellular data communication, are also considered within the scope of the present disclosure.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the smart phone 57. The smart phone 57 can include computer processing capability, a transceiver capable of communicating using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the smart phone 57 includes a GPS module capable of receiving GPS satellite signals and generating GPS coordinates based on those signals. In other embodiments, the smart phone 57 includes cellular communications functionality such that the smart phone 57 carries out voice and/or data communications over the wireless carrier system 60 using one or more cellular communications protocols, as are discussed herein. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the smart phone 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12.

While the embodiment illustrated in FIG. 1 includes a vehicle having an internal combustion engine, other considered embodiments include other powertrain configurations such as fuel cells or battery electric vehicles (BEVs).

Figure 2:
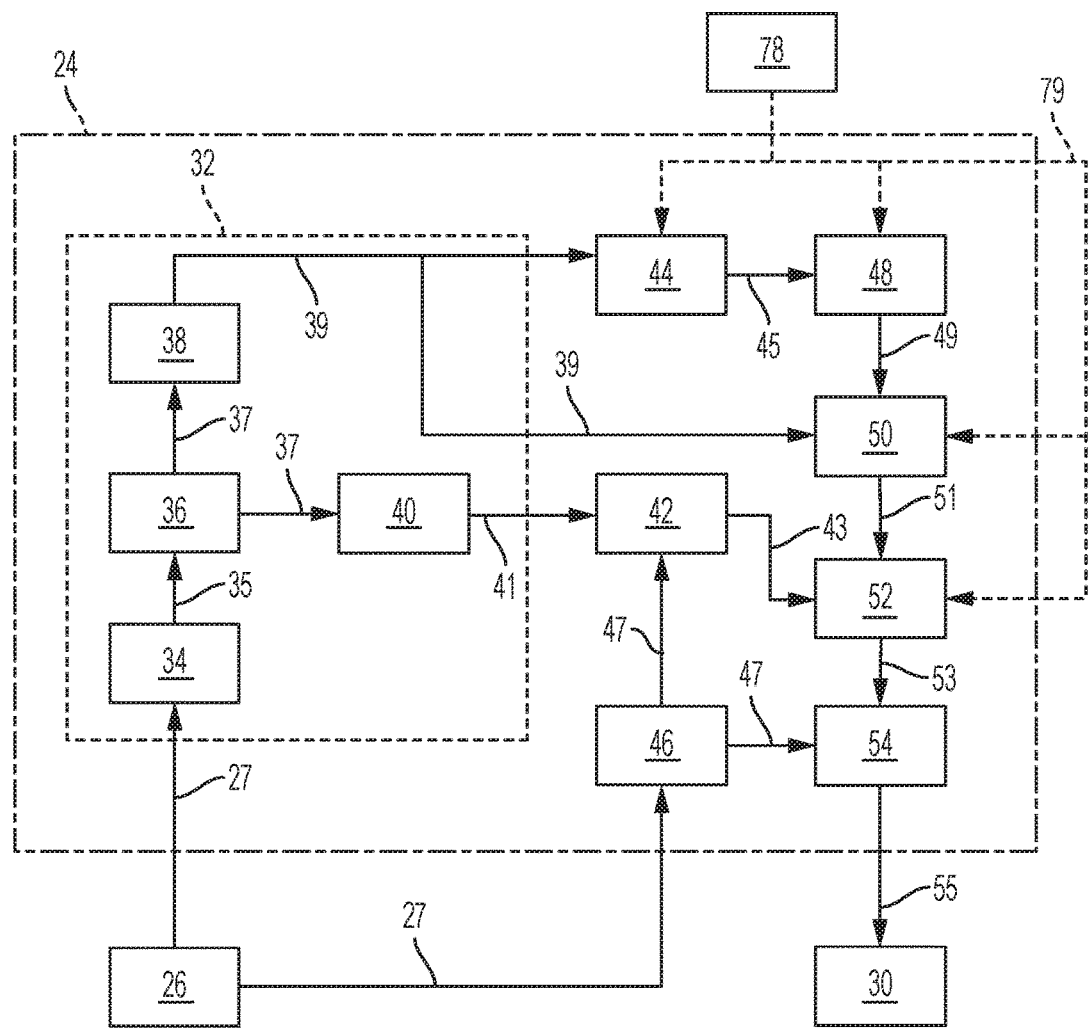
FIG. 2 is a schematic block diagram of an automated driving system (ADS) for a vehicle according to an embodiment of the present disclosure.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks. The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation. The localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading and velocity information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78, if any.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

Traditional operator-controlled vehicles are generally calibrated with the comfort of an occupant in mind. As an example, vehicle powertrains are configured to minimize vibrations and sound within the vehicle cabin, in order to facilitate occupant comfort. As another example, various accessory systems such as a radio, climate control, and heated seats may be provided to facilitate occupant comfort.

However, during some portions of autonomous vehicle drive cycles, the autonomous vehicle is unoccupied. During these portions, cabin sound and vibration reductions are less important, and accessory systems are not required. As will be discussed in further detail below, it is thus possible to conserve energy by controlling the powertrain in more efficient calibrations while allowing cabin sound and vibrations to increase, by reducing power draw of accessories, and by otherwise reducing energy consumption.

Figure 3:
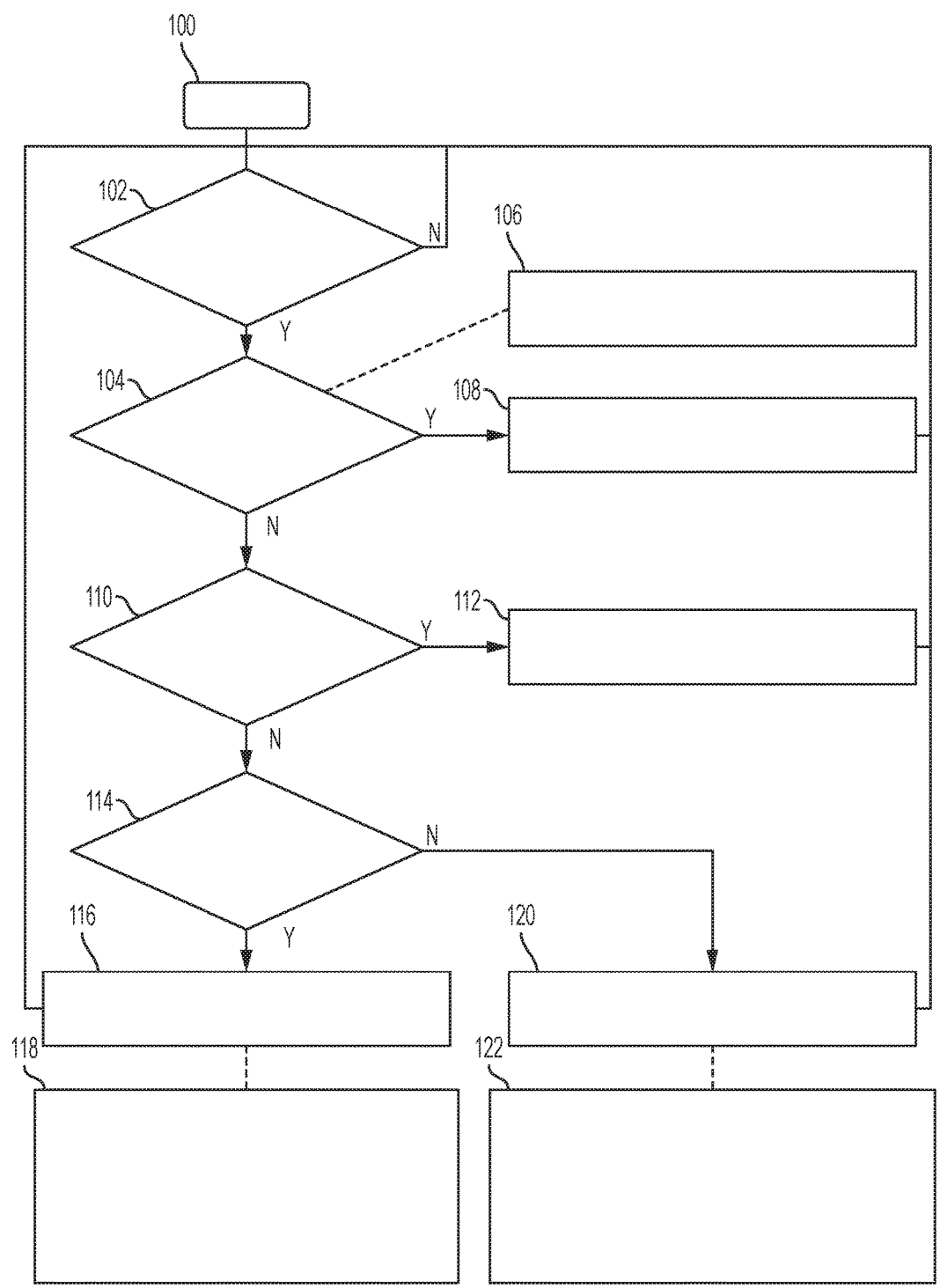
FIG. 3 is a flowchart representation of a method of controlling a vehicle according to an embodiment of the present disclosure.

Referring now to FIG. 3, a method of controlling an autonomous vehicle according to the present disclosure is illustrated in flowchart form. The algorithm begins at block 100.

A determination is made of whether the host vehicle is under the control of an ADS, as illustrated at operation 102. Some host vehicles within the scope of the present disclosure may be capable of both traditional operator control and of autonomous driving under the control of an ADS.

If the determination is negative, control returns to operation 102. Thus, the algorithm does not proceed unless and until the host vehicle is under the control of an ADS, e.g. operating autonomously.

If the determination is positive, then a determination is made of whether the host vehicle is subject to an externally-dictated operating requirement, as illustrated at operation 104. Externally-dictated operating requirements refer to operating conditions, imposed by authorities external to the host vehicle, with which the host vehicle is required to comply. Examples of externally-dictated operating requirement may include regulatory or environmental requirements, such as so-called "green zones" within which electric operation is mandated or preferred, as illustrated at block 106.

If the determination is positive, the vehicle is automatically controlled to satisfy the externally-dictated operating requirement, as illustrated at block 108. Control then returns to operation 102.

If the determination is negative, then a determination is made of whether an occupant is detected within the host vehicle, as illustrated at operation 110. The determination may be made in response to a reading from at least one sensor, such as the sensors 26 illustrated in FIG. 1. The sensor may include a weight sensor, a seat belt sensor, thermal sensor for occupant detection, microphone, biometric sensor, other sensors as appropriate, or combination thereof.

If the determination is positive, then the host vehicle is automatically controlled according to a default autonomous mode, as illustrated at block 112. Thus, when an occupant is present in the host vehicle, the ADS controls the vehicle according to the default calibration, e.g. with the powertrain calibrated for occupant comfort and with accessory systems available. Control then returns to operation 102.

If the determination is negative, then a determination is made of whether an electric-only (EV) mode of operation is required for a subsequent drive cycle, as illustrated at operation 114. This determination may be made based on known information about the subsequent drive cycle. As an example, if the route for the subsequent drive cycle is known, and the route passes through a green zone, then a determination may be made that EV operation is required for the subsequent drive cycle.

If the determination is positive, then the host vehicle is automatically controlled in a charge elevation mode to increase state of charge of a high voltage battery, as illustrated at block 116. As illustrated at block 118 and discussed below, this may include controlling powertrain components, accessory systems, and other components of the host vehicle in alternate modes of operation to increase battery state of charge.

In an exemplary embodiment, controlling the host vehicle in the charge elevation mode includes automatically locking a torque converter clutch. In the default mode of operation, a certain amount of slippage may be permitted in order to reduce powertrain vibrations, which may also result in energy losses. In the charge elevation mode, the torque converter clutch may be locked to decrease energy losses.

In another exemplary embodiment, controlling the host vehicle in the charge elevation mode includes automatically modifying a transmission shift schedule. In the default mode of operation, the default transmission shift schedule may be calibrated to balance satisfactory performance while also minimizing cabin noise and vibration. In the charge elevation mode, the transmission may be controlled according to an alternate shift schedule for increased fuel economy, while allowing cabin noise and vibration to increase.

In another exemplary embodiment, controlling the host vehicle in the charge elevation mode includes automatically modifying a calibration of the engine. In the default mode of operation, the default engine calibration may be configured to balance satisfactory performance while also minimizing cabin noise and vibration. In the charge elevation mode, the engine may be controlled according to an increased efficiency calibration, while allowing cabin noise and vibration to increase.

In yet another exemplary embodiment, controlling the host vehicle in the charge elevation mode includes automatically reducing an accessory power draw. Various accessories such as a radio, a climate control system, heated seats, or other accessories may be deactivated or switched to a low-power mode.

In still another exemplary embodiment, controlling the host vehicle in the charge elevation mode includes automatically controlling vehicle braking rate and braking torque to increase a quantity of kinetic energy recaptured through regenerative braking. In the default mode of operation, vehicle braking may be controlled to balance braking performance with occupant comfort. In the charge elevation mode, regenerative braking may be prioritized.

In another exemplary embodiment, controlling the host vehicle in the charge elevation mode includes automatically reducing a maximum allowable host vehicle velocity. In the default mode of operation, maximum velocity may be calibrated to balance performance with occupant comfort and desire for speed. In the charge elevation mode, the maximum velocity may be reduced to reduce drag and, in turn, increase fuel economy.

In yet another exemplary embodiment, controlling the host vehicle in the charge elevation mode includes modifying a planned vehicle route to increase efficiency. This may include, for example, re-routing along a longer route with less change in elevation, increasing efficiency.

After automatically controlling the vehicle in charge elevation mode at block 116, control returns to operation 102.

Returning to operation 114, if the determination is negative, then the host vehicle is automatically controlled according to an increased energy efficiency mode, as illustrated at block 120. As illustrated at block 122 and discussed below, this may include controlling powertrain components, accessory systems, and other components of the host vehicle in alternate modes of operation to increase energy efficiency.

In various embodiments, controlling the host vehicle in an increased energy efficiency mode includes locking a torque converter clutch, modifying a transmission shift schedule, modifying an engine calibration, reducing accessory power draw, reducing maximum allowable host vehicle velocity, and modifying a planned vehicle route, as generally discussed above with respect to the charge elevation mode.

In another embodiment, controlling the host vehicle in an increased energy efficiency mode includes limiting allowable acceleration and deceleration rates. In the default mode of operation, maximum acceleration and deceleration rates may be controlled to balance vehicle performance with occupant comfort and safety. In the increased energy efficiency mode, maximum acceleration and deceleration rates may be reduced to increase energy efficiency.

In still another embodiment, controlling the host vehicle in an energy efficiency mode includes deactivating engine cylinders of an internal combustion engine. In the default mode of operation, the engine may utilize all cylinders. In the increased energy efficiency mode, one or more cylinders may be deactivated to increase energy efficiency.

After automatically controlling the vehicle in the increased energy mode at block 120, control returns to operation 102.

As may be seen, the present disclosure provides a system and method whereby an autonomous vehicle may, when under ADS control and with no occupants detected, operate in an alternate mode for increased energy efficiency, battery SOC elevation, or both.

In addition to the above, various other components may also be controlled in alternate modes to increase energy efficiency when the host vehicle is under ADS with no occupants detected. Examples include, but are not limited to: controlling motors according to alternative calibrations, modifying suspension tuning, deactivating active mounts, modifying tire pressure, changing sample rates of various sensors, deactivating an infotainment system and/or in-vehicle internet, deactivating active noise cancellation systems, reducing alternator current, deactivating warning lamps or tones, and modifying the pulse width modulation of electric motors or other vehicle components.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be onboard as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
   traction wheels;
   a powertrain configured to transmit drive power to the traction wheels, the powertrain being selectively operable in a first mode having a first operating characteristic and a second mode having a second operating characteristic;
   an actuator configured to control vehicle steering, acceleration, braking, or shifting;
   a sensor configured to detect a presence of an occupant; and at least one controller configured to automatically control the actuator based on an automated driving system algorithm, to control the powertrain in the first mode in response to the sensor detecting an occupant being present and the actuator being controlled based on the automated driving system algorithm with the vehicle in motion, and to control the powertrain in the second mode in response to the sensor detecting no occupant being present and the actuator being controlled based on the automated driving system algorithm with the vehicle in motion.

2. The vehicle of claim 1, wherein the first operating characteristic includes a first energy consumption rate and the second operating characteristic includes a second energy consumption rate, distinct from the first energy consumption rate.

3. The vehicle of claim 1, wherein the powertrain includes an engine, and wherein the first mode includes controlling the engine at a first operating point and the second mode includes controlling the engine at a second operating point, distinct from the first operating point.

4. The vehicle of claim 1, wherein the powertrain includes a torque converter having a clutch, and wherein the first mode includes controlling the clutch to a first pressure and the second mode includes controlling the clutch to a second pressure, distinct from the first pressure.

5. The vehicle of claim 1, wherein the powertrain includes a transmission, and wherein the first mode includes controlling the transmission according to a first shift schedule and the second mode includes controlling the transmission according to a second shift schedule, distinct from the first shift schedule.

6. The vehicle of claim 1, further comprising an accessory system, wherein the at least one controller is additionally configured to, in response to the sensor detecting no occupant being present and the actuator being controlled based on the automated driving system algorithm, reduce a power consumption rate of the accessory system.

7. The vehicle of claim 1, wherein the at least one controller includes a first microprocessor for controlling the actuator and a second microprocessor for controlling the powertrain.

8. A method of controlling a vehicle, comprising:
providing the vehicle with a powertrain configured to provide power to vehicle wheels;
providing the vehicle with at least one actuator configured to control vehicle steering, acceleration braking, or shifting;
providing the vehicle with a controller configured to control the actuator based on an automated driving system algorithm;
in response to an occupant being present in the vehicle, the vehicle being in motion, and the actuator being controlled based on the automated driving system algorithm, automatically controlling the powertrain in a first mode having a first energy consumption rate; and
in response to no occupant being present in the vehicle, the vehicle being in motion, and the actuator being controlled based on the automated driving system algorithm, automatically controlling the powertrain in a second mode having a second energy consumption rate, the second energy consumption rate being distinct from the first energy consumption rate.

9. The method of claim 8, wherein the powertrain includes an internal combustion engine operable according to distinct first and second calibrations, controlling the powertrain in the first mode includes controlling the internal combustion engine according to the first calibration, and controlling the powertrain in the second mode includes controlling the internal combustion engine according to the second calibration.

10. The method of claim 8, wherein the powertrain includes a torque converter having a clutch, controlling the powertrain in the first mode includes controlling the clutch to a first pressure, and controlling the powertrain in the second mode includes controlling the clutch to a second pressure, distinct from the first pressure.

11. The method of claim 8, wherein controlling the powertrain in the second mode includes reducing a maximum allowable acceleration, deceleration, or velocity of the vehicle relative to the first mode.

12. The method of claim 8, further comprising:
providing the vehicle with an accessory system; and
in response to no occupant being present in the vehicle and the actuator being controlled based on the automated driving system algorithm, automatically reducing a power consumption rate of the accessory system.

13. The method of claim 8, further comprising, in response to a determination that the vehicle is subject to an externally-dictated operating requirement, controlling the powertrain to satisfy the externally-dictated operating requirement independent of occupant presence.

14. The method of claim 8, wherein the controlling the powertrain in the second mode is in further response to a determination that an electric-only operation mode is desired for a subsequent trip, and controlling the powertrain in the second mode includes controlling the powertrain to increase a high-voltage battery state of charge.

15. The method of claim 8, wherein the controlling the powertrain in the second mode is in further response to a determination that an electric-only operation mode is not desired for a subsequent trip, and controlling the powertrain in the second mode includes controlling the powertrain to increase energy efficiency.

16. A system for controlling a vehicle comprising:
a first controller configured to automatically control at least one actuator of a vehicle steering actuator, an acceleration actuator, a braking actuator, and a shifting actuator based on an automated driving system algorithm; and
a second controller configured to selectively control a powertrain of the vehicle in a first mode in response to the first controller automatically controlling the actuator based on the automated driving system algorithm and a vehicle occupant being detected, and in a second mode in response to the first controller automatically controlling the actuator based on the automated driving system algorithm and no vehicle occupant being detected, the first mode having a first operating characteristic and the second mode having a second operating characteristic.

17. The system of claim 16, wherein the first operating characteristic includes a first energy consumption rate and the second operating characteristic includes a second energy consumption rate, distinct from the first energy consumption rate.

18. The system of claim 16, wherein the second controller is further configured to, in response to a determination that the vehicle is subject to an externally-dictated operating requirement, control the powertrain to satisfy the externally-dictated operating requirement independent of occupant presence.

19. The system of claim 16, wherein the second controller is configured to control the powertrain in the second mode in further response to a determination that an electric-only operation mode is desired for a subsequent trip, and wherein controlling the powertrain in the second mode includes controlling the powertrain to increase a high-voltage battery state of charge.

20. The system of claim 16, wherein the first controller is associated with a first microprocessor and the second controller is associated with a second microprocessor.

\* \* \* \* \*